(12) United States Patent
Yoshimura et al.

(10) Patent No.: US 12,509,224 B2
(45) Date of Patent: Dec. 30, 2025

(54) ROTORCRAFT INCLUDING CIRCULAR WINGS

(71) Applicant: SUBARU CORPORATION, Tokyo (JP)

(72) Inventors: Kensuke Yoshimura, Tokyo (JP); Keisuke Tajiri, Tokyo (JP); Takeshi Fukurose, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 136 days.

(21) Appl. No.: 18/383,981

(22) Filed: Oct. 26, 2023

(65) Prior Publication Data

US 2024/0150013 A1    May 9, 2024

(51) Int. Cl.
*B64C 29/00* (2006.01)
*B64C 39/06* (2006.01)
*B64D 27/357* (2024.01)

(52) U.S. Cl.
CPC ........ *B64C 29/0016* (2013.01); *B64C 39/064* (2013.01); *B64D 27/357* (2024.01)

(58) Field of Classification Search
CPC ............ B64C 29/0016; B64C 29/0025; B64C 39/064; B64U 30/30
See application file for complete search history.

(56) References Cited

U.S. PATENT DOCUMENTS

| | | | |
|---|---|---|---|
| 2,014,051 A * | 9/1935 | Nishi | B64C 29/0016 244/180 |
| 3,314,628 A * | 4/1967 | Myers | B64C 29/0025 D12/325 |
| 4,941,628 A | 7/1990 | Sakamoto et al. | |
| 5,328,131 A | 7/1994 | Fodera et al. | |
| 11,320,840 B2 | 5/2022 | Shimizu et al. | |
| 11,502,577 B2 | 11/2022 | Kotani | |
| 2011/0101155 A1 | 5/2011 | Smith | |

(Continued)

FOREIGN PATENT DOCUMENTS

| | | |
|---|---|---|
| CN | 201086824 Y | 7/2008 |
| CN | 101301931 A | 11/2008 |

(Continued)

OTHER PUBLICATIONS

Extended European Search Report, Issued on Mar. 22, 2024 in European Application No. 23208253.7 (In English).

(Continued)

*Primary Examiner* — Joshua J Michener
*Assistant Examiner* — Ryan Andrew Yankey
(74) *Attorney, Agent, or Firm* — MCGINN I.P. LAW GROUP, PLLC

(57) ABSTRACT

A rotorcraft includes a fuselage, rotors and circular wings. The rotors are attached to the fuselage. The rotors are attached to the fuselage. The circular wings are disposed under the rotors respectively. Upper surfaces of the circular wings have annular curved surfaces and thereby are convex upward respectively. The circular wings cause Coanda effects by the upper surfaces respectively. First lift is generated by rotating the rotors. Second lift is generated by the Coanda effects by the circular wings. Third lift is generated by air jets deflected downward along the upper surfaces of the circular wings respectively.

6 Claims, 9 Drawing Sheets

(56) References Cited

U.S. PATENT DOCUMENTS

| | | | | |
|---|---|---|---|---|
| 2012/0068021 A1* | 3/2012 | Babinsky | ............ | B64C 39/064 |
| | | | | 29/428 |
| 2016/0107756 A1* | 4/2016 | Liske | ................... | B64D 27/357 |
| | | | | 244/54 |
| 2020/0220428 A1 | 7/2020 | Kotani | | |
| 2020/0331601 A1* | 10/2020 | Sabie | ..................... | B64U 10/20 |
| 2022/0212806 A1 | 7/2022 | Kotani | | |

FOREIGN PATENT DOCUMENTS

| | | | | | |
|---|---|---|---|---|---|
| CN | 103803078 A | | 5/2014 | | |
| CN | 104816823 A | | 8/2015 | | |
| EP | 3770063 A1 | | 1/2021 | | |
| GB | 2471663 A | * | 1/2011 | ........... | B64C 39/064 |
| JP | S 59-195496 A | | 11/1984 | | |
| JP | H 01-301495 A | | 12/1989 | | |
| JP | 2005-119622 A | | 5/2005 | | |
| JP | 2009-029400 A | | 2/2009 | | |
| JP | 2010-111216 A | | 5/2010 | | |
| JP | 2010-120420 A | | 6/2010 | | |
| JP | 2018-008563 A | | 1/2018 | | |
| JP | 2020-111124 A | | 7/2020 | | |
| JP | 2020-138713 A | | 9/2020 | | |
| KR | 20150055202 A | * | 5/2015 | ........... | B64C 39/064 |
| WO | 93/24367 A1 | | 12/1993 | | |
| WO | WO-2009135260 A1 | * | 11/2009 | ............ | B64C 27/20 |
| WO | WO 2021/095395 A1 | | 5/2021 | | |

OTHER PUBLICATIONS

Florin Nedelcut, "Coand Effect aerodyne—a new platform concept for a fluvial and ecological remote sensing aerial vehicle" Nov. 13, 2014 URL: https://www.cedren.no/Portals/Cedren/5_NedelcutF_CoandaAerodyne.pdf.

Florin Nedelcut, Coanda Effect UAV—A New Born Baby in the Unmanned Aerial Vehicles Family May 2010 URL: https://www.researchgate.net/publication/316646410_ Coanda_Effect_UAV_-_a_New_Born_Baby_in_the_Unmanned_Aerial_Vehicles_Family.

* cited by examiner

ROTORCRAFT INCLUDING CIRCULAR WINGS

CROSS REFERENCES TO RELATED APPLICATIONS

This application is based upon and claims the benefit of priority from Japanese Patent Application No. 2022-179159, filed on Nov. 8, 2022; the entire contents of which are incorporated herein by reference.

FIELD

Implementations described herein relate generally to a rotorcraft.

BACKGROUND

A multicopter is known as a type of a rotorcraft (for example, refer to Japanese Patent Application Publication JP 2018-008563 A, Japanese Patent Application Publication JP 2020-111124 A, Japanese Patent Application Publication JP 2020-138713 A and international publication WO 2021/095395 A). A multicopter is a rotorcraft that has three or more rotors, as opposed to a helicopter that has a main rotor and a tail rotor. A quadcopter having four rotors and a hexacopter having six rotors are each a typical multicopter. A UAV (Unmanned aerial vehicle), such as a helicopter or a multi-copter, is called a drone. On the other hand, a manned aircraft consisting of a multi-copter is also called a flying car.

Any multicopter can take off and land vertically, and therefore is classified as a VTOL (vertical take-off and landing aircraft). A typical multicopter is an electric rotorcraft in which each rotor is rotated by an electric motor, and therefore is also called an eVTOL, which means an electric VTOL.

An object of the present invention is to reduce the size and weight of a rotorcraft, such as a multicopter, a drone or a flying car.

SUMMARY

In general, according to one implementation, a rotorcraft includes a fuselage, rotors and circular wings. The rotors are attached to the fuselage. The circular wings are disposed under the rotors respectively. Upper surfaces of the circular wings have annular curved surfaces and thereby are convex upward respectively. The circular wings cause Coanda effects by the upper surfaces respectively. First lift is generated by rotating the rotors. Second lift is generated by the Coanda effects by the circular wings. Third lift is generated by air jets deflected downward along the upper surfaces of the circular wings respectively.

DETAILED DESCRIPTION

A rotorcraft according to implementations of the present invention will be described with reference to the accompanying drawings.

First Implementation

Figure 1:
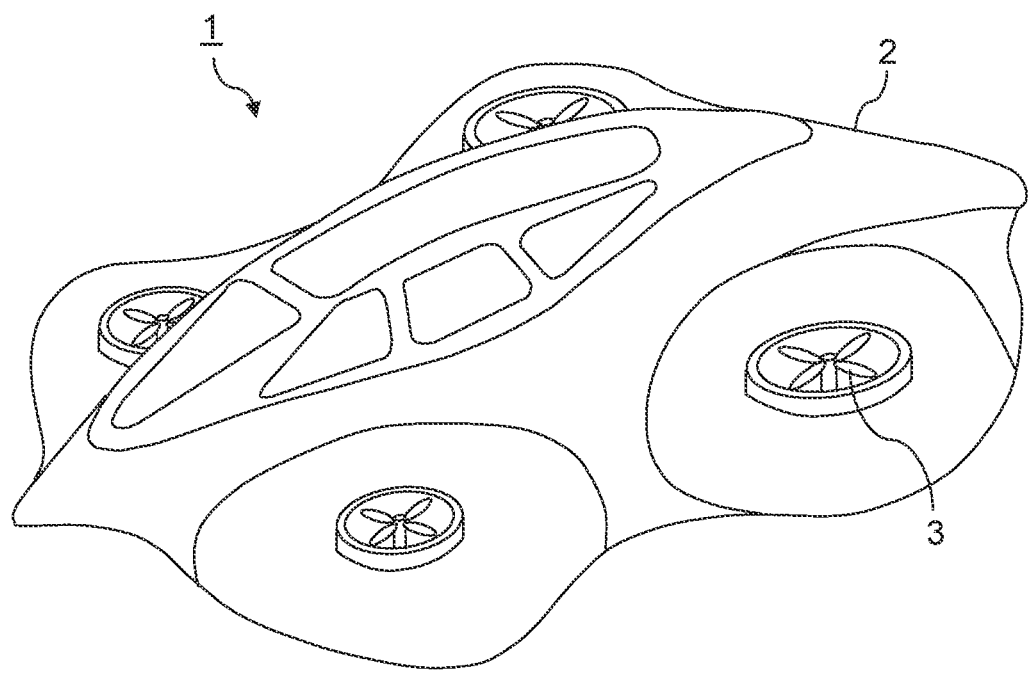
FIG. 1 is a perspective view showing an example of a schematic structure of a rotorcraft according to the first implementation of the present invention.

FIG. 1 is a perspective view showing an example of a schematic structure of a rotorcraft 1 according to the first implementation of the present invention.

The rotorcraft 1 includes a fuselage 2 and rotors 3 coupled to the fuselage 2. The rotor 3 may be called a fan or a propeller. Although FIG. 1 illustrates an example of a case where the rotorcraft 1 is a multicopter having the four rotors 3, the rotorcraft 1 may have a desired number of the rotors 3. The rotorcraft 1 may be a UAV, also called a drone, a manned aircraft, also called a flying car, or an OPV (Optionally Piloted Vehicle). An OPV is an unmanned aerial vehicle that can also be operated by a pilot, i.e., a hybrid aircraft between a manned aircraft and an unmanned aerial vehicle.

The rotorcraft 1 can perform vertical takeoff and landing, thrust generation, and attitude control by controlling the rotation speeds of the rotors 3 and the like. Therefore, the rotorcraft 1 can be classified as a VTOL.

Figure 2:
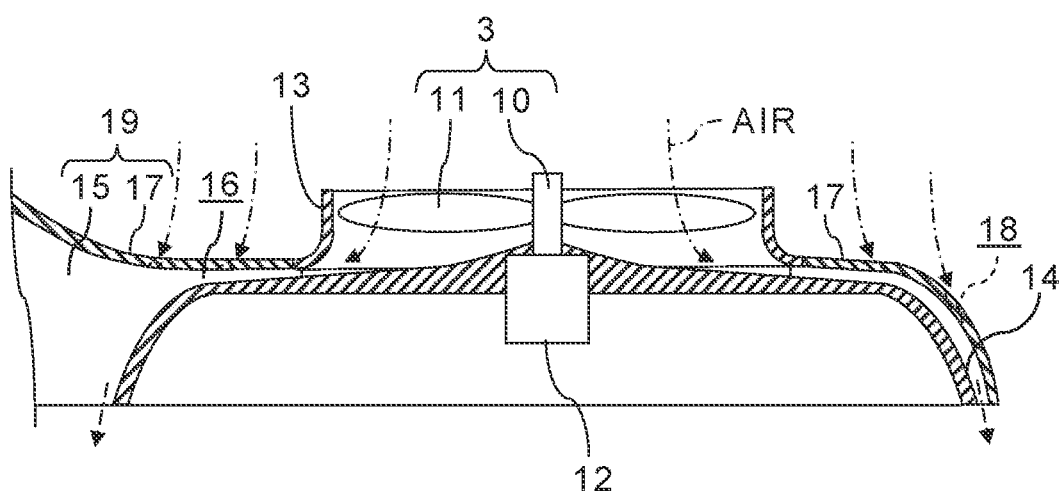
FIG. 2 is a longitudinal sectional view showing an example of a detailed structure of a portion including the rotor of the rotorcraft shown in FIG. 1.
Figure 3:
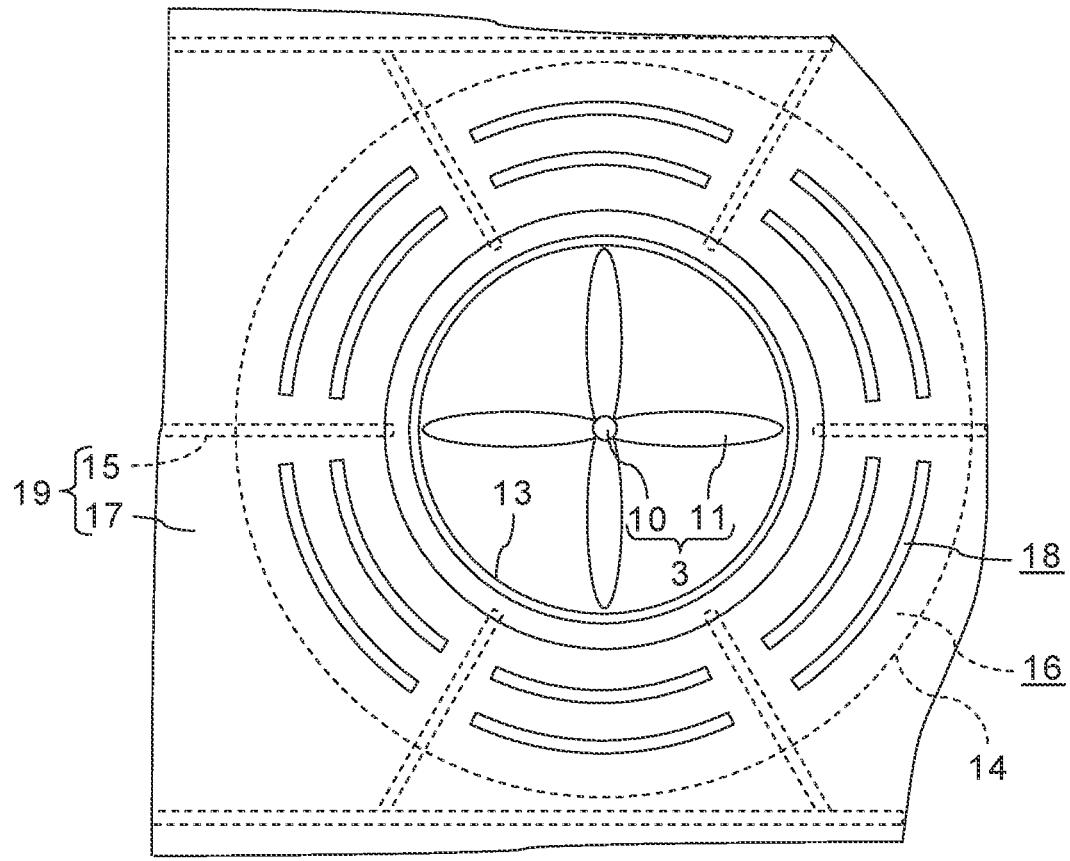
FIG. 3 is a top view of the portion including the rotor shown in FIG. 2.

FIG. 2 is a longitudinal sectional view showing an example of a detailed structure of a portion including the rotor 3 of the rotorcraft 1 shown in FIG. 1. FIG. 3 is a top view of the portion including the rotor 3 shown in FIG. 2.

Each rotor 3 is composed of a rotating shaft 10 and a desired number of blades 11 fixed to the rotating shaft 10. The rotating shaft 10 of each rotor 3 is integrated with an output shaft of an electric motor 12 and thereby can be rotated by the power of the electric motor 12. That is, the rotorcraft 1 is an electric VTOL and can be classified as an eVTOL.

Although FIG. 2 shows the rotor 3 in which the pitch angle of the blades 11 is fixed and therefore only the rotation speed of the blades 11 can be controlled by controlling the electric motor 12, an electric actuator may be attached so that the pitch angle of the blades 11 can be controlled.

Nevertheless, when the pitch angle of the blades 11 is fixed as illustrated in FIG. 2, the structure of the rotor 3 can be simplified.

The outer circumference of the rotor 3 can be protected with a cylindrical cover 13. In other words, the rotor 3 can be disposed inside a duct formed by the cylindrical cover 13. Note that, a fan covered with a cylindrical duct is called a ducted fan.

In addition, a circular wing 14 is disposed below each rotor 3. The upper surface of each circular wing 14 has a shape that causes the Coanda effect. More specifically, the upper surface of each circular wing 14 has an annular curved surface so that the upper surface of each circular wing 14 may be convex upward and thereby the Coanda effect may arise due to air drawn in by the rotation of the rotor 3. The Coanda effect is a phenomenon in which a jet of viscous fluid draws in the surrounding fluid, thereby generating a force that attracts a convex wall surface.

Therefore, lift can be generated not only by the rotors 3 but also by the circular wings 14. That is, the rotorcraft 1 has the circular wings 14 for generating lift by the Coanda effect in addition to the rotors 3 for generating lift.

The lower surface of the circular wing 14 can have a desired shape. In this context, no air flow for generating lift is formed on the lower surface side of the circular wing 14. Therefore, it is reasonable to form the circular wing 14 in a plate shape as shown in FIG. 2 from the viewpoint of reducing the weight of the circular wing 14. More specifically, the circular wing 14 can be composed of a circular disc that is curved so as to be an upwardly convex shape as shown in FIG. 2.

The electric motor 12 for rotating the rotor 3 can be fixed to the circular wing 14 so that the housing of the electric motor 12 may not protrude on the upper surface side of the circular wing 14 but may protrude on the lower surface side of the circular wing 14. That is, only the output shaft of the electric motor 12 integrated with the rotating shaft 10 of the rotor 3 can be projected to the upper surface side of the circular wing 14. Thereby, it is possible to prevent an air flow formed on the upper surface of the circular wing 14 from being disturbed.

In order to effectively obtain the lift force due to the Coanda effect, it is preferable to form airflow radially toward the annular curved surface along the upper surface of the circular wing 14. Therefore, it is appropriate to dispose the rotor 3 and the circular wing 14 so that the central axis of the rotor 3 and the central axis of the circular wing 14 may lie on a same straight line. In order to direct the air drawn in by the rotation of the rotor 3 to the upper surface of the circular wing 14, a gap to allow the air to flow has to be formed between the cover 13 of the rotor 3 and the upper surface of the circular wing 14. Therefore, ribs 15 can be fixed on the upper surface of the circular wing 14 so that the length directions of the ribs 15 may be radial, and the cover 13 of the rotor 3 can be fixed to the ribs 15. The shape of the cross section of each rib 15 can be a desired shape, such as a hat shape or an I-shape.

In order to create favorable airflow along the upper surface of each circular wing 14, it is desirable to cover the upper surface of each circular wing 14 so that an air flow path 16 along the upper surface of each circular wing 14 and an air intake to each flow path 16 may be formed. Accordingly, it is practical not only to cover at least part of the upper surface of each circular wing 14 with a cowl 17 with a gap so that the air flow path 16 may be formed between the cowl 17 and the upper surface of each circular wing 14, but also to form each cowl 17 with inlets 18 for drawing ambient air into the flow path 16.

A cowl is a rectifying part that covers an engine or a fuselage of an aircraft or the like. A plate-shaped cowl is called a cowl plate. The cowl 17 that covers the curved upper surface of each circular wing 14 realistically consists of a cowl plate having a curved portion so that the cowl plate may have a convex shape upward in accordance with the shape of the curved upper surface of the circular wing 14.

Each cowl 17 can also be fixed to the upper surface of the circular wing 14 through the ribs 15 similarly to the cover 13 of the rotor 3. The ribs 15 can be disposed at appropriate positions to ensure strength. The rotor 3 and the circular wing 14 can be fixed to the fuselage 2 with a support structure 19 composed of the cowl 17 and the ribs 15. The support structure 19 for fixing the rotor 3 and the circular wing 14 to the fuselage 2 may be composed of a rod-shaped arm. In that case, the first cowl 17 covering the circular wing 14 and the second cowl 17 forming the fuselage 2 may be placed separately, and the first cowl 17 covering the circular wing 14 may have an inverted bowl shape or a dome shape like the circular wing 14.

The duct consisting of the cover 13 of the rotor 3 forms an air flow path toward the upper surface of the circular wing 14 and functions as an air intake to the air flow path 16 along the upper surface of the circular wing 14. Accordingly, the cowl 17 can be disposed around the cover 13 of the rotor 3 so as not to interfere with the cover 13. When the length of the blades 11 is short, the annular curved surface of the circular wing 14 that causes the Coanda effect lies outside the cover 13. Accordingly, an upper surface portion including the annular curved surface of the circular wing 14 that causes the Coanda effect can be covered with the cowl 17 having the inlets 18.

The inlets 18 formed in the cowl 17 may be, e.g., intermittent arc-like slits disposed concentrically as shown in FIG. 3. In the example shown in FIG. 3, two slits are formed in the cowl 17 as the inlets 18 in the radial direction of the rotor 3 and the circular wing 14 between each adjacent two of the radially disposed ribs 15. Note that, through-holes may be formed in the cowl 17 as the inlets 18 in addition to the slits or with forming no slits.

Forming the inlets 18 in the cowl 17 allows drawing air outside the cowl 17 into the air flow path 16 along the upper surface of the circular wing 14. It is appropriate to determine conditions including positions, shapes, sizes and the number of the inlets 18 by testing, simulation or the like so that an appropriate amount of air can be drawn into the flow path 16 while preventing the drawn air from leaking from the flow path 16.

Using the rotors 3 with the circular wings 14 described above allows generating three kinds of lift. The first lift is generated by rotating the rotors 3. That is, the first lift is generated by air drawn into the rotors 3. The second lift is generated by the Coanda effects in the circular wings 14. Specifically, when air is fed into the flow paths 16 along the upper surfaces of the circular wings 14 by rotating the rotors 3 respectively, the fed air is radially accelerated and thereby air is drawn from the inlets 18 of the cowls 17 due to the Coanda effects. Thereby, the second lift is generated in the circular wings 14 on the upper surfaces of the circular wings 14. Furthermore, the third lift is generated at the end portions of the circular wings 14 due to downward deflections of air jets along the upper surfaces of the circular wings 14 respectively.

(Effects)

As described above, the rotorcraft 1 has the circular wings 14, for generating lift, disposed below the rotors 3. Therefore, according to the rotorcraft 1, each rotor 3 can be made smaller since the circular wings 14 can also generate lift. As a result, the weight of the rotorcraft 1 can be reduced, and thereby the flight range can be extended.

Figure 4:
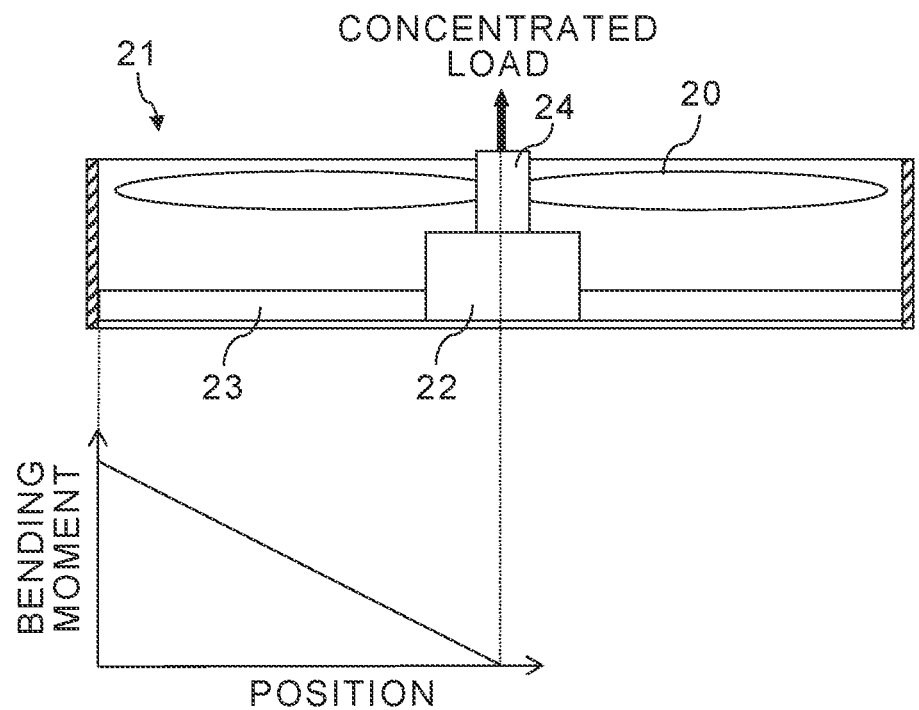
FIG. 4 explains a problem in a conventional rotorcraft that generates lift only with rotors.

FIG. 4 explains a problem in a conventional rotorcraft 21 that generates lift only with rotors 20.

As shown in FIG. 4, the conventional rotorcraft 21 that generates lift only with the rotors 20 has to have the large rotors 20 so that the weight of the body can be received only by the lift generated with the rotors 20. In this case, not only the weight of the rotors 20 and electric motors 22 increases, but also the lengths of arms 23 supporting the rotors 20 and the electric motors 22 respectively increase. Accordingly, as shown in a graph representing a relative value of bending moment applied to the arm 23 at each position, the bending moment applied to the arm 23 increases due to lift generated as a concentrated load on a rotating shaft 24 of the rotor 20. As a result, there is a problem that constraints are increased in order to satisfy aerodynamic requirements.

In addition, in the case of the conventional rotorcraft 21 in which lift is generated only by the rotors 20, it is necessary to transmit not only torque for rotating the rotor 20 but also lift generated by the rotor 20 through the output shaft of the electric motor 22 which is integral with the rotating shaft 24 of the rotor 20. Accordingly, there is a problem that the power consumption and weight of each electric motor 22 are increased.

Due to this background, if a flying car, which is heavier and requires a larger size than a UAV, is produced as the conventional rotorcraft 21 that generates lift only with the rotors 20, a problem that the cruising range is shortened and it is difficult to increase the size arises.

Figure 5:
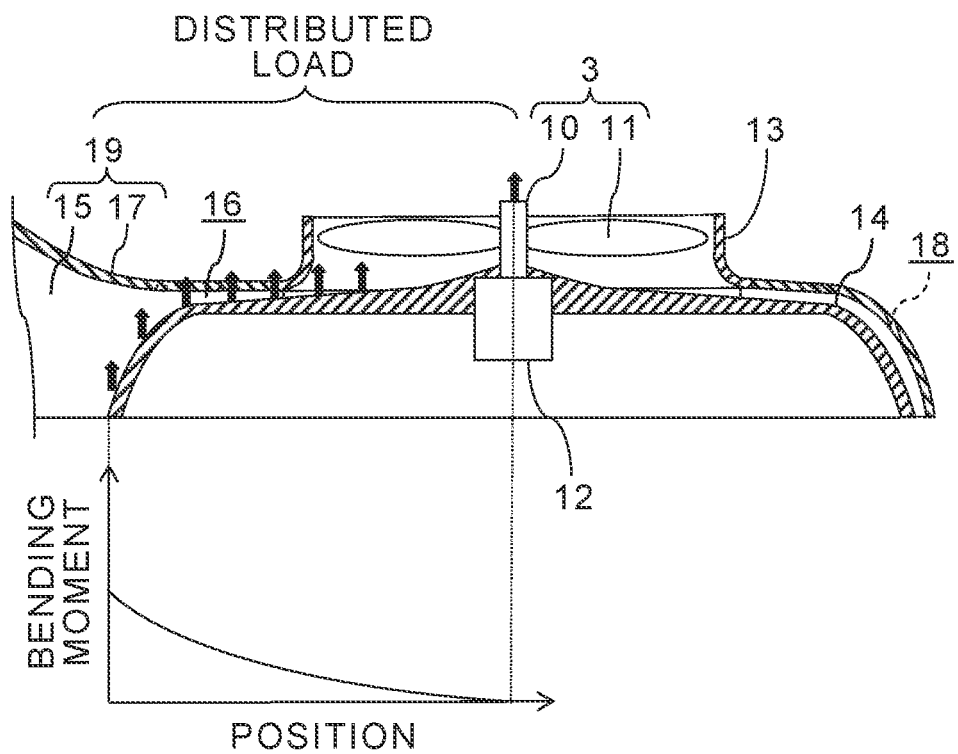
FIG. 5 explains effects of the rotorcraft that generates lift with both the rotors and the circular wings as shown in FIG. 2.

FIG. 5 explains effects of the rotorcraft 1 that generates lift with both the rotors 3 and the circular wings 14 as shown in FIG. 2.

When lift is generated with both the rotor 3 and the circular wing 14 as shown in FIG. 5, not only the rotor 3 can be miniaturized, but also the lift distribution can be distributed over the upper surface of the circular wing 14. That is, the lift can be a distributed load instead of a concentrated load. As a result, the bending moment applied to the circular wing 14 supporting the rotor 3 can be reduced as shown in a graph representing a relative value of the bending moment at each position. Moreover, there are no aerodynamic constraints on the lower surface side of the circular wing 14.

In addition, the lift transmitted by the output shaft of the electric motor 12 is reduced by the amount of lift generated by the circular wing 14. As a result, the structural weight for supporting the electric motor 12 as well as the size, weight and power consumption of the electric motor 12 can be reduced.

According to the rotorcraft 1 in which lift is generated by both the rotors 3 and the circular wings 14, the effect of improving safety and quietness can also be attained in addition to the effects described above. More specifically, enclosing the rotors 3 with the covers 13 and shielding the upper surfaces of the circular wings 14 with the cowls 17 make it possible to expose only the upper sides of the downsized rotors 3 to the outside. In particular, there is no possibility that a person or an object will come into contact with each rotor 3 from below since the lower sides of the rotors 3 are shielded by the circular wings 14 respectively. Accordingly, safety can be ensured. In addition, noise can be prevented. Furthermore, it is easy to attach a sound absorbing material or the like to the cover 13 of the rotor 3, the circular wing 14 and/or the cowl 17 in order to further improve the quietness.

Second Implementation

Figure 6:
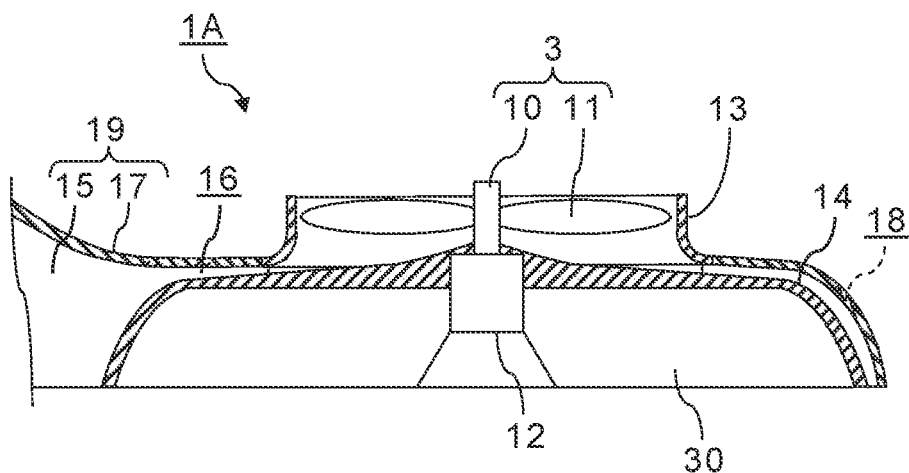
FIG. 6 is a longitudinal sectional view showing a structure of a circular wing included in a rotorcraft according to the second implementation of the present invention.
Figure 7:
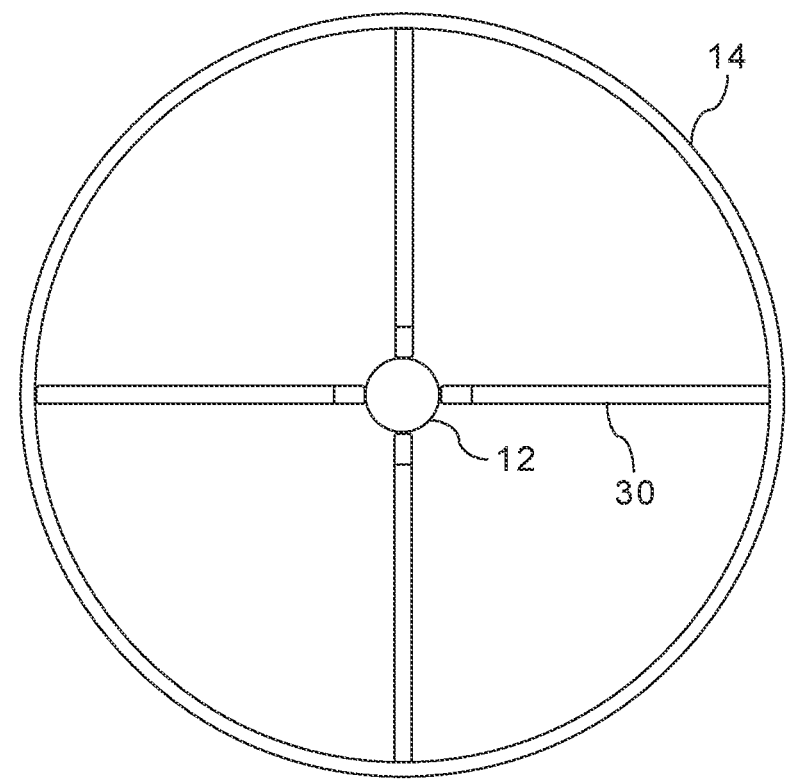
FIG. 7 is a bottom view of the circular wing shown in FIG. 6.

FIG. 6 is a longitudinal sectional view showing a structure of a circular wing 14 included in a rotorcraft 1A according to the second implementation of the present invention. FIG. 7 is a bottom view of the circular wing 14 shown in FIG. 6.

The rotorcraft 1A according to the second implementation shown in FIG. 6 and FIG. 7 differs from the rotorcraft 1 according to the first implementation in that the lower surface side of each circular wing 14 is reinforced with ribs 30. Other structures and actions of the rotorcraft 1A in the second implementation are not substantially different from those of the rotorcraft 1 in the first implementation. Therefore, only a portion including the circular wing 14 is shown, and the same elements and the corresponding elements are denoted with the same reference signs while explanation thereof is omitted.

The lift generated by the rotor 3 and the circular wing 14 is distributed in the radial directions of the rotor 3 and the circular wing 14, and bending moment is generated in the circular wing 14 due to the distributed lift. On the other hand, when the circular wing 14 is composed only of a curved circular plate, the strength of the circular wing 14 may be insufficient.

In such a case, the ribs 30 can be attached on the lower surface side of the circular wing 14 to ensure the strength of the circular wing 14 as shown in FIG. 6 and FIG. 7. Although the four ribs 30 whose length directions are radial directions of the circular wing 14 are radially disposed around the electric motor 12 in the example shown in FIG. 6 and FIG. 7, a desired number of the ribs 30 may be placed at desired locations. The shape of the cross section of each rib 30 may be a desired shape, such as a hat shape or an I-shape.

According to the second implementation described above, greater lift can be generated by the rotors 3 and the circular wings 14. As a result, it is possible to increase the size of the rotorcraft 1A.

Third Implementation

Figure 8:
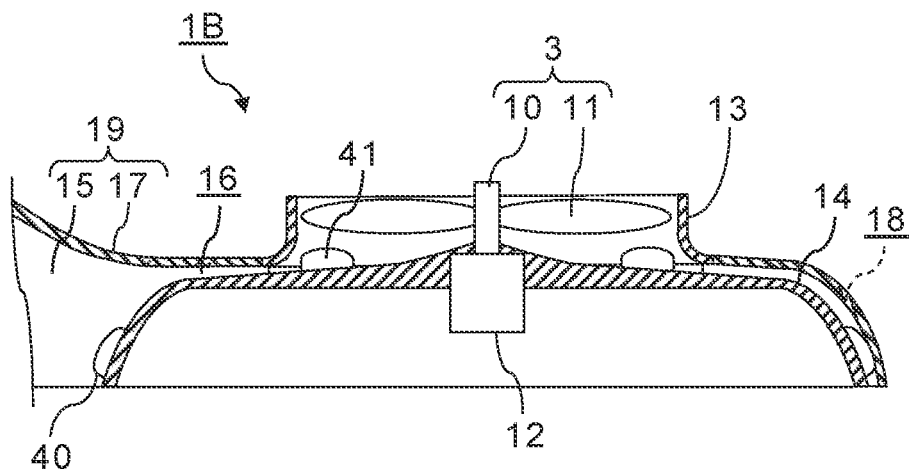
FIG. 8 is a longitudinal sectional view showing a structure of a circular wing included in a rotorcraft according to the third implementation of the present invention.
Figure 9:
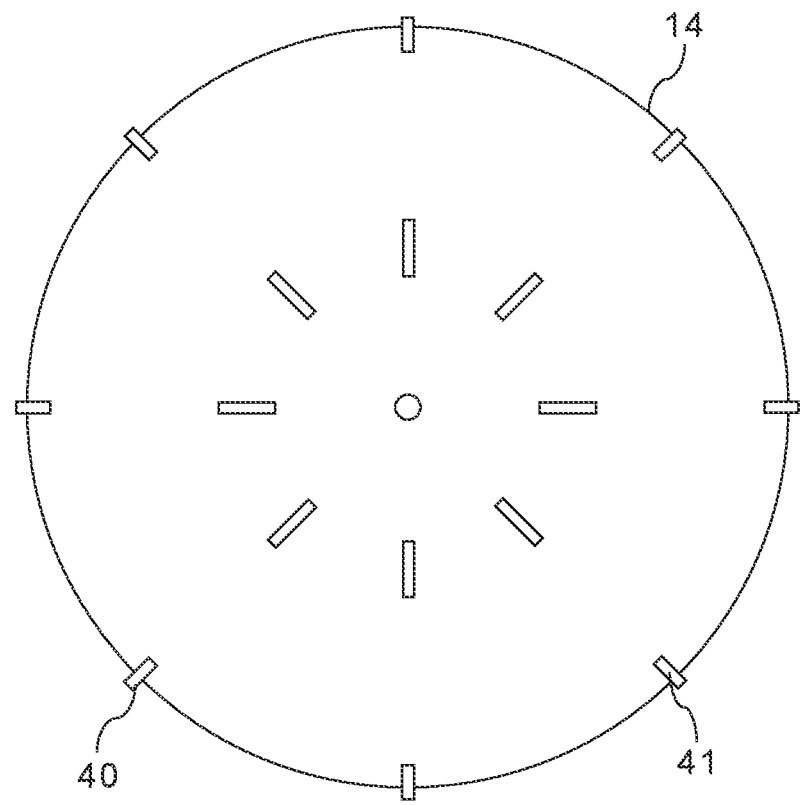
FIG. 9 is a top view of the circular wing shown in FIG. 8.

FIG. 8 is a longitudinal sectional view showing a structure of a circular wing 14 included in a rotorcraft 1B according to the third implementation of the present invention. FIG. 9 is a top view of the circular wing 14 shown in FIG. 8.

The rotorcraft 1B according to the third implementation shown in FIG. 8 and FIG. 9 differs from each of the rotorcraft 1 according to the first implementation and the rotorcraft 1A according to the second implementation in that rudders 40 are attached on the upper surface of the circular wing 14. Other structures and actions of the rotorcraft 1B in the third implementation are not substantially different from those of each of the rotorcraft 1 in the first implementation and the rotorcraft 1A in the second implementation. Therefore, only a portion including the circular wing 14 is shown, and the same elements and the corresponding elements are denoted with the same reference signs while explanation thereof is omitted.

As shown in FIG. 8 and FIG. 9, the rudders 40 may be attached to the upper surface of each circular wing 14. In the examples shown in FIG. 8 and FIG. 9, fins 41 protruding from the upper surface of the circular wing 14 inside the cover 13 of the rotor 3 as well as fins 41 projecting from the upper surface of the circular wing 14 to the flow path 16 inside the cowl 17 are radially disposed around the central axis of the rotor 3 and the circular wing 14 as the rudders 40 respectively. The inclination angle of each fin 41 with respect to the upper surface of the circular wing 14 can be variably controlled by an electric actuator.

Although FIG. 8 and FIG. 9 show an example in which the fins 41 whose length directions are radial directions of the circular wing 14 are attached on the upper surface of the circular wing 14, the length direction of at least one of the fins 41 attached to the upper surface of the circular wing 14 may be a direction intersecting a radial direction of the circular wing 14 like a circumferential direction or a tangential direction of the circular wing 14. The ribs 30 may also be attached to the lower surface of the circular wing 14 in order to reinforce the strength of the circular wing 14 as in the second implementation.

According to the above-described third implementation, thrust deflection and the like of the rotorcraft 1B can be performed by controlling the rudders 40 in addition to controlling the rotors 3. Accordingly, even when the pitch angles of the rotors 3 are fixed, an attitude control of the rotorcraft 1B is facilitated. As a result, variable pitch rotors become unnecessary, and thereby the structures of the rotors 3 can be simplified. In addition, an increase in power consumption of each electric motor 12 and an increase in structural weight for supporting each rotor 3 can be avoided since the rudders 40 are disposed on the upper surfaces of the circular wings 14 that are not supported by the output shafts of the electric motors 12.

Fourth Implementation

Figure 10:
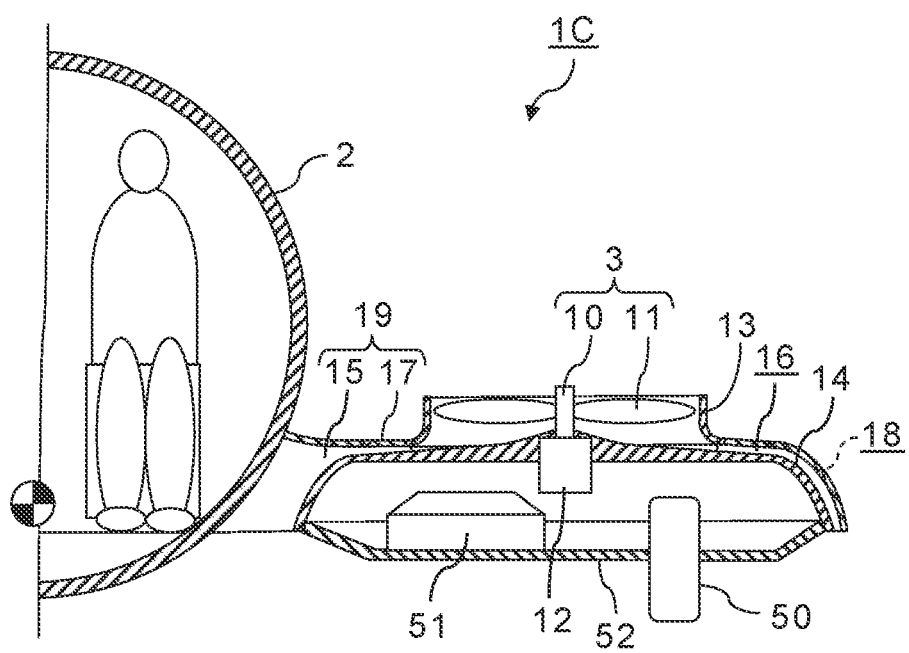
FIG. 10 is a partial sectional view showing an example of a structure of a rotorcraft according to the fourth implementation of the present invention.

FIG. 10 is a partial sectional view showing an example of a structure of a rotorcraft 1C according to the fourth implementation of the present invention.

The rotorcraft 1C according to the fourth implementation shown in FIG. 10 differs from each of the rotorcrafts 1, 1A and 1B according to the first to third implementations in that a wheel 50 and a battery 51 are disposed below at least one of the circular wings 14. Other structures and actions of the rotorcraft 1C in the fourth implementation are not substantially different from those of each of the rotorcrafts 1, 1A and 1B in the first to third implementations. Therefore, only part of the rotorcraft 1C is shown, and the same elements and the corresponding elements are denoted with the same reference signs while explanation thereof is omitted.

The space immediately below each circular wing 14 can be utilized for disposing one or more objects. Accordingly, a plate 52 forming a floor can be coupled below each circular wing 14 so that one or more heavy objects can be placed on the plate 52. That is, a storage box for one or more heavy objects can be formed by coupling the plate 52 below each circular wing 14.

In the example shown in FIG. 10, the rotor 3 and the circular wing 14 forming the storage box are coupled to the fuselage 2 by the support structure 19 composed of the cowl 17 and the ribs 15. That is, the rotor 3 and the circular wing 14 are supported by the support structure 19. As a matter of course, the rotor 3 and the circular wing 14 may be supported by a desired support structure, such as a frame or an arm.

Typical examples of heavy objects included in the rotorcraft 1C include the wheels 50 and the batteries 51. Accordingly, at least one of the wheel 50 and the battery 51 can be disposed below each circular wing 14. As a matter of course, one or more devices, such as a payload, may be placed below at least one of the circular wings 14. When the battery 51 is common to the rotors 3, the battery 51 may be disposed in a space inside the fuselage 2, such as a space under a floor of a passenger cabin.

When the number of the wheels 50 is less than the number of the circular wings 14 as in a case where the number of the wheels 50 is four while the number of the rotors 3 provided with the circular wings 14 is six, and when a space below at least one of the circular wings 14 is not suitable for disposing the wheel 50, the wheels 50 may be placed at locations, suitable for disposing the wheels 50, below some of the circular wings 14. Therefore, at least one of the wheels 50 and the batteries 51 can be respectively disposed below at least two of the circular wings 14.

When both the wheels 50 and the batteries 51 are respectively disposed below at least two of the circular wings 14 as illustrated in FIG. 10, it is desirable to dispose each battery 51 between the wheel 50 and the fuselage 2. This is because the stability of the rotorcraft 1C during ground running can be improved by widening the distance between the two wheels 50 forming a pair.

When no batteries are placed under a floor of a passenger cabin, a space for placing one or more batteries is not required under the floor whereas batteries installed in a typical flying car is placed under a floor of a passenger cabin in order to lower the center of gravity. Accordingly, the center of gravity of the flying car including crew weight can be lowered by lowering the floor.

Thus, the center of gravity of the rotorcraft 1C including the crew and passengers can be made lower than the position of each rotor 3 by disposing the batteries 51 right below the circular wings 14 respectively while securing no space for the battery 51 or the batteries 51 under the floor of the passenger cabin. As a result, the stability of the rotorcraft 1C during flight can be improved.

(Effects)

In the fourth implementation described above, the space under each circular wing 14 is effectively used as a space for placing the wheel 50, the battery 51 and the like. Therefore, according to the fourth implementation, the rotorcraft 1C can have a lower center of gravity, improved ease of maintenance, reduced weight and improved stability compared to a conventional rotorcraft as detailed below.

Conventional rotorcrafts including a flying car are roughly classified into a first type, in which rotors are disposed on the upper side of a fuselage, and a second type, in which rotors are disposed on the lower side of a fuselage.

Figure 11:
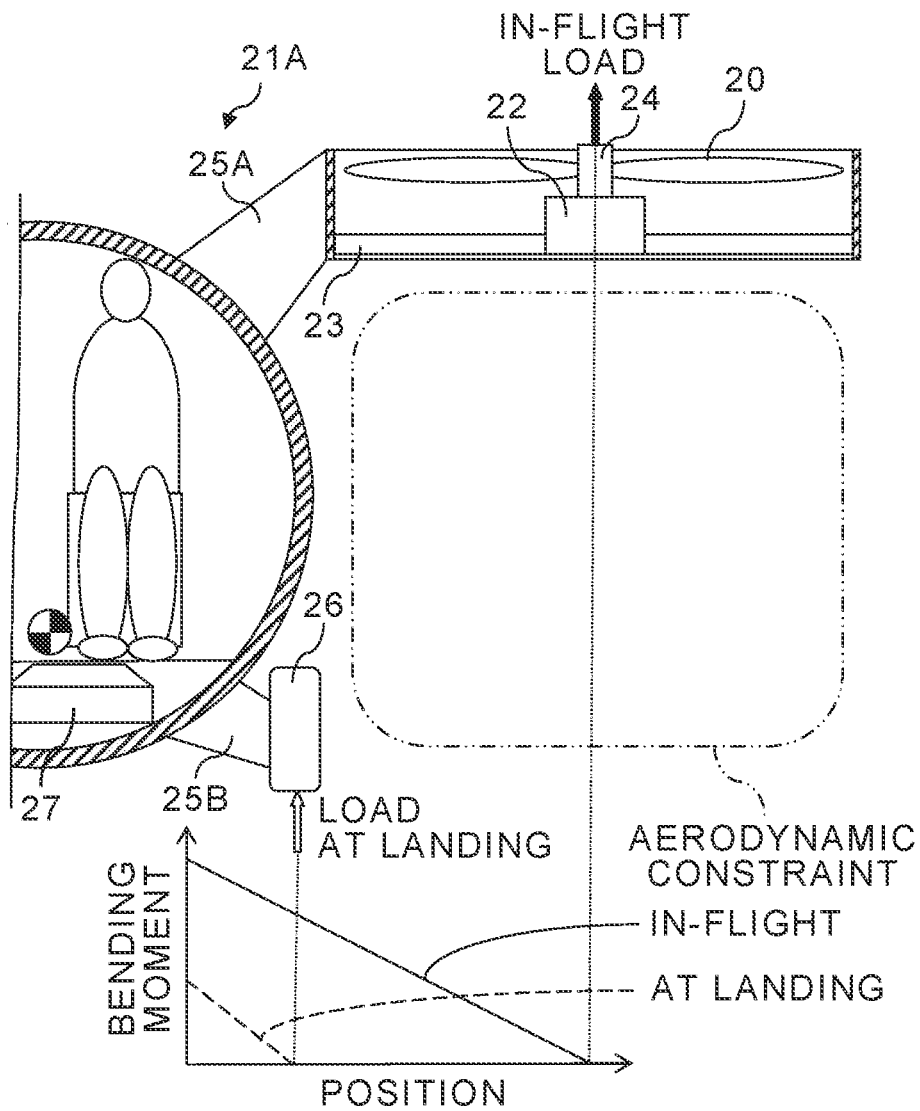
FIG. 11 explains a problem in a conventional rotorcraft in which rotors are disposed on the upper side of a fuselage.

FIG. 11 explains a problem in a conventional rotorcraft 21A in which rotors 20 are disposed on the upper side of a fuselage.

When the conventional large rotor 20, in which a rotating shaft 24 of the rotor 20 is rotated by an electric motor 22 supported by an arm 23, is disposed on the upper side of the fuselage as shown in FIG. 11, a support structure 25A for the rotor 20 and a support structure 25B for the wheel 26 are required separately. Accordingly, not only the weight of the rotorcraft 21A increases, but also bending moment is applied to the support structures 25A and 25B separately during flight and at landing of the rotorcraft 21A as shown in a graph representing relative values of the bending moment applied to the support structures 25A and 25B at each position.

Therefore, it is necessary to design the strength of each of the support structures 25A and 25B according to the bending moment. Moreover, there is a large difference between the bending moment acting on the support structure 25A during flight of the rotorcraft 21A and the bending moment acting on the support structure 25B at landing of the rotorcraft 21A. Therefore, the support structures 25A and 25B are inefficient in terms of strength.

In addition, objects, such as the wheel 26 and the battery 27, cannot be placed below the rotor 20 due to aerodynamic constraints. As a result, not only the distance between the wheels 26 cannot be increased, which reduces the stability of the rotorcraft 21A taxiing on the ground, but also the center of gravity of the rotorcraft 21A including crew and passengers becomes high together with the height of the floor of the cabin under which the battery 27 or the batteries 27 have to be placed. Further, maintenance of the rotor 20 is not easy since the rotor 20 is located on the upper side of the fuselage.

Figure 12:
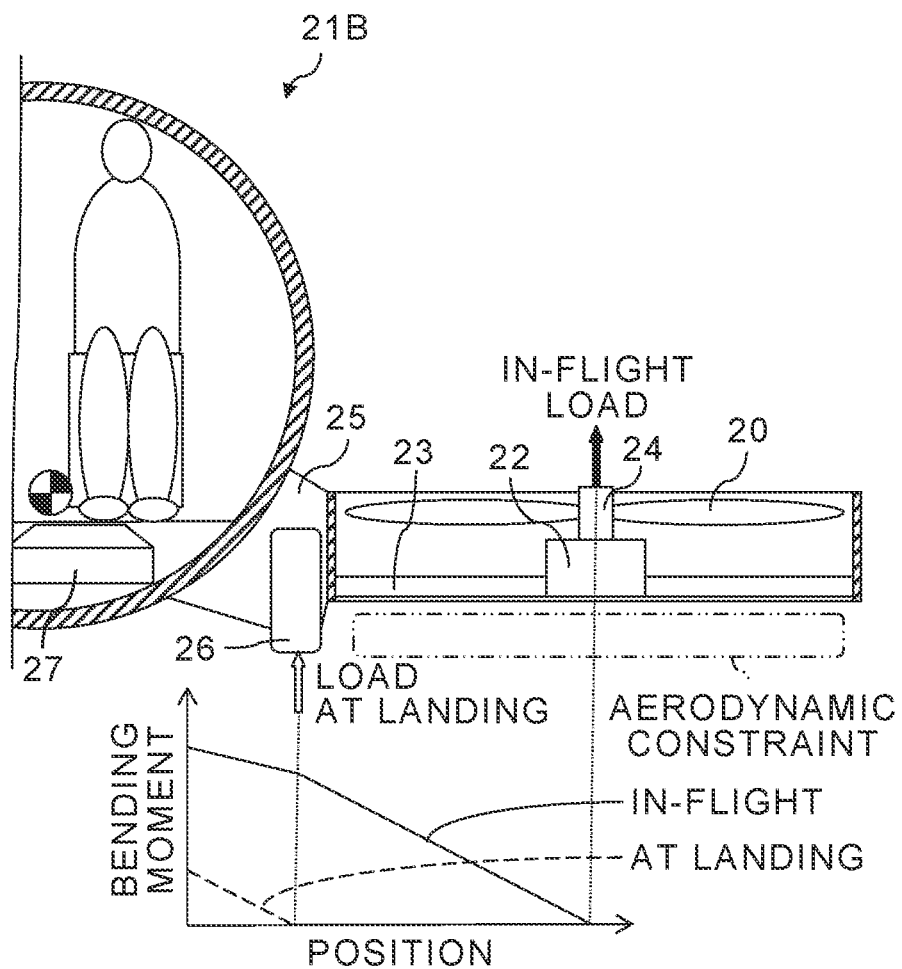
FIG. 12 explains a problem in a conventional rotorcraft in which the rotors are disposed on the lower side of a fuselage.

FIG. 12 explains a problem in a conventional rotorcraft 21B in which the rotors 20 are disposed on the lower side of a fuselage.

When the conventional large rotor 20, in which the rotating shaft 24 of the rotor 20 is rotated by the electric motor 22 supported by the arm 23, is disposed on the lower side of the fuselage as shown in FIG. 12, objects, such as the wheel 26 and the battery 27, cannot be placed below the rotor 20 due to aerodynamic constraints, similarly to a case where the rotor 20 is disposed on the upper side of the fuselage. As a result, the distance between the wheels 26 cannot be increased, which reduces the stability of the rotorcraft 21B taxiing on the ground.

Further, the battery 27 or the batteries 27 have to be placed under the floor of the cabin, and thereby the center of gravity of crew and passengers becomes high together with the height of the floor. As a result, the center of gravity of the rotorcraft 21B including the crew and the passengers becomes higher than the position of each rotor 20, which reduces the stability of the rotorcraft 21B during flight.

In addition, although the wheel 26 and the rotor 20 can be supported by a common support structure 25, there is a large difference between bending moment acting on the support structure 25 during flight of the rotorcraft 21B and bending moment acting on the support structure 25 at landing of the rotorcraft 21B as shown in a graph representing a relative value of the bending moment applied to the support structure 25 at each position. Therefore, the support structure 25 is inefficient in terms of strength.

Figure 13:
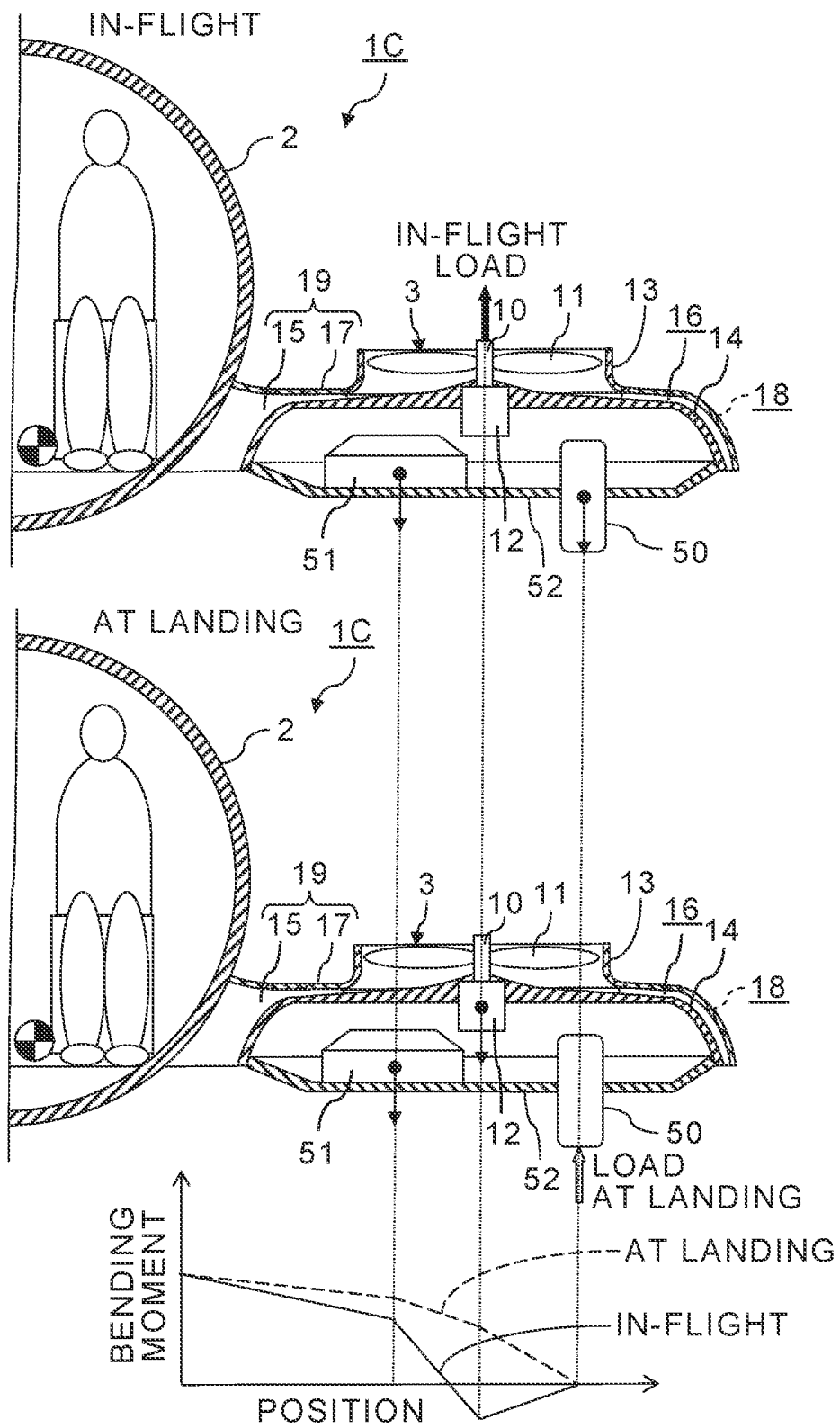
FIG. 13 explains effects of the rotorcraft shown in FIG. 10.

FIG. 13 explains effects of the rotorcraft 1C shown in FIG. 10.

In the case of the rotorcraft 1C in which the wheel 50 and the battery 51 are disposed below the rotor 3 and the circular wing 14 as shown in FIG. 13, no space for disposing the battery 51 is required under the floor. Accordingly, the center of gravity of the rotorcraft 1C including the crew and passengers can be made lower than the position of each rotor 3 by lowering positions of seats for the crew and the passengers. As a result, the stability of the rotorcraft 1C during flight can be improved. Meanwhile, the stability of the rotorcraft 1C taxiing on the ground can also be improved since the distance between the wheels 50 can be made wider than before regardless of the presence or absence of the battery 51.

During flight of the rotorcraft 1C, the gravity of the battery 51 and the wheel 50 acts in a direction that cancels the lift generated by the rotor 3 and the circular wing 14. On the other hand, when the rotorcraft 1C is at landing, the gravity of the rotor 3 and the wheel 50 acts in a direction that cancels the normal force acting on the wheel 50 from the ground.

As a result, a load and bending moment acting on the support structure 19 of the rotor 3 and the circular wing 14 can be reduced during flight and landing of the rotorcraft 1C. Therefore, not only the wheel 50 and the rotor 3 can be supported by the common support structure 19, but also the strength of the support structure 19 itself can be reduced, which leads to a reduction in the weight of the rotorcraft 1C. Further, the difference in the bending moment acting on the support structure 19 and the circular wing 14 including the plate 52 between when the rotorcraft 1C is in-flight and when the rotorcraft 1C is at landing is reduced as shown in a graph representing a relative value of the bending moment applied to the support structure 19 and the circular wing 14 including the plate 52 at each position. Therefore, the support structure 19 is efficient in terms of strength.

In addition to the effects described above, the equipment and devices to be maintained, such as the rotor 3, the electric motor 12, the battery 51 and the wheel 50, can be gathered downward outside the fuselage 2. Therefore, the labor required for maintenance of the rotorcraft 1C can be reduced.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A rotorcraft comprising:
a fuselage;
rotors attached to the fuselage; and
circular wings disposed under the rotors respectively, upper surfaces of the circular wings having annular curved surfaces and thereby being convex upward respectively, the circular wings causing Coanda effects by the upper surfaces respectively,
wherein first lift is generated by rotating the rotors,
wherein second lift is generated by the Coanda effects by the circular wings, and
wherein third lift is generated by air jets deflected downward along the upper surfaces of the circular wings respectively,
further including cowls respectively covering at least portions of the upper surfaces of the circular wings, the portions of the upper surfaces including the annular curved surfaces, the cowls being disposed apart from the portions of the upper surfaces and thereby air flow paths being formed between the cowls and the upper surfaces, the cowls having inlets for drawing air into the air flow paths.

2. The rotorcraft according to claim 1, further comprising:
rudders protruding from the upper surfaces of the circular wings into the air flow paths respectively.

3. The rotorcraft according to claim 1, further comprising:
wheels; and
batteries,
wherein, one of the wheels and/or one of the batteries is disposed below each of at least two of the circular wings.

4. The rotorcraft according to claim 1, further comprising:
wheels; and
batteries,
wherein the wheels and the batteries are disposed below at least two of the circular wings respectively so that a center of gravity of the rotorcraft lies below the rotors, and
the batteries are disposed between the fuselage and the wheels respectively.

5. The rotorcraft according to claim 2, further comprising:
wheels; and
batteries,
wherein one of the wheels and/or one of the batteries is disposed below each of at least two of the circular wings.

6. The rotorcraft according to claim 2, further comprising:
wheels; and
batteries,
wherein the wheels and the batteries are disposed below at least two of the circular wings respectively so that a center of gravity of the rotorcraft lies below the rotors, and
the batteries are disposed between the fuselage and the wheels respectively.

\* \* \* \* \*